(12) United States Patent
Teng et al.

(10) Patent No.: US 11,308,946 B2
(45) Date of Patent: Apr. 19, 2022

(54) METHODS AND APPARATUS FOR ASR WITH EMBEDDED NOISE REDUCTION

(71) Applicant: Cerence Operating Company, Burlington, MA (US)

(72) Inventors: Jianzhong Teng, Shanghai (CN); Xiao-Lin Ren, Shanghai (CN); Xingui Zeng, Shanghai (CN); Yi Gao, Shanghai (CN)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/521,641

(22) Filed: Jul. 25, 2019

(65) Prior Publication Data
US 2019/0348032 A1 Nov. 14, 2019

Related U.S. Application Data

(63) Continuation of application No. PCT/US2017/015077, filed on Jan. 26, 2017.

(51) Int. Cl.
| | |
|---|---|
| *G10L 15/20* | (2006.01) |
| *G10L 15/02* | (2006.01) |
| *G10L 15/08* | (2006.01) |
| *G10L 15/22* | (2006.01) |
| *G10L 21/0232* | (2013.01) |
| *G10L 25/24* | (2013.01) |
| *G10L 25/84* | (2013.01) |

(52) U.S. Cl.
CPC .............. *G10L 15/20* (2013.01); *G10L 15/02* (2013.01); *G10L 15/08* (2013.01); *G10L 15/22* (2013.01); *G10L 21/0232* (2013.01); *G10L 25/24* (2013.01); *G10L 25/84* (2013.01); *G10L 2015/088* (2013.01)

(58) Field of Classification Search
CPC ..... G10L 15/20; G10L 15/02; G10L 21/0208; G10L 25/84
See application file for complete search history.

(56) References Cited

U.S. PATENT DOCUMENTS

| | | |
|---|---|---|
| 6,741,873 B1 | 5/2004 | Doran et al. |
| 2005/0010406 A1 | 1/2005 | Koshiba et al. |
| 2005/0080623 A1* | 4/2005 | Furui .................... G10L 15/065 704/233 |

(Continued)

FOREIGN PATENT DOCUMENTS

| | | |
|---|---|---|
| EP | 1 081 685 A2 | 3/2001 |
| EP | 1081685 A2 | 3/2001 |

OTHER PUBLICATIONS

International Preliminary Report on Patentability dated Jul. 30, 2019 from corresponding International Patent Application No. PCT/US2017/015077, 7 pages.

(Continued)

*Primary Examiner* — Jialong He
(74) *Attorney, Agent, or Firm* — Occhiuti & Rohlicek LLP (57) ABSTRACT

Methods and an apparatus for performing feature extraction on speech in a microphone signal with embedded noise processing to reduce the amount of processing are provided. In embodiments, feature extraction and the noise estimate use an output of the same Fourier Transform, such that the noise filtering of the speech is embedded with the feature extraction of the speech.

21 Claims, 6 Drawing Sheets

(56) References Cited

U.S. PATENT DOCUMENTS

| | | |
|---|---|---|
| 2008/0059163 A1 | 3/2008 | Ding et al. |
| 2008/0114593 A1* | 5/2008 | Tashev ................ G10L 21/0208 704/226 |
| 2008/0208577 A1 | 8/2008 | Jeong et al. |
| 2009/0177468 A1* | 7/2009 | Yu ........................... G10L 15/02 704/233 |
| 2010/0153104 A1* | 6/2010 | Yu ....................... G10L 21/0208 704/233 |
| 2011/0077939 A1 | 3/2011 | Jung et al. |
| 2012/0185243 A1* | 7/2012 | Fukuda .................. G10L 15/02 704/205 |
| 2013/0185067 A1* | 7/2013 | Ichikawa ................ G10L 15/20 704/233 |
| 2013/0231929 A1 | 9/2013 | Komeji et al. |
| 2013/0289994 A1* | 10/2013 | Newman ................ G10L 15/32 704/254 |
| 2013/0339028 A1* | 12/2013 | Rosner ................ H04R 29/004 704/275 |
| 2014/0358552 A1* | 12/2014 | Xu ........................ G06F 1/3215 704/275 |
| 2015/0120290 A1* | 4/2015 | Shagalov .............. G10L 15/083 704/231 |
| 2016/0240194 A1 | 8/2016 | Lee et al. |
| 2016/0253997 A1* | 9/2016 | Kerr ........................ G10L 15/22 381/110 |
| 2016/0267908 A1* | 9/2016 | Borjeson ................ G10L 25/78 |

OTHER PUBLICATIONS

International Search Report dated Oct. 23, 2017 from corresponding International Patent Application No. PCT/US2017/015077, 3 pages.
Written Opinion dated Oct. 23, 2017 from corresponding International Patent Application No. PCT/US2017/015077, 6 pages.

* cited by examiner

METHODS AND APPARATUS FOR ASR WITH EMBEDDED NOISE REDUCTION

CROSS REFERENCE TO RELATED APPLICATION

This application is a continuation of PCT/US2017/015,077, filed on Jan. 26, 2017, which designates the U.S., and is published in English. The entire contents of the above application are incorporated herein by reference.

BACKGROUND OF THE DISCLOSURE

1. Field of the Disclosure

The disclosure relates to automatic speech recognition systems and noise filtering.

2. Description of Related Art

As is known in the art, computer speech recognition (a.k.a., automatic speech recognition or ASR) is the process of automatically converting spoken words into text by a computer. Illustrative applications of ASR include speech transcription, speech translation, voice control of devices, etc. Speech recognition systems operate by matching acoustics with acoustic signatures of words. These acoustic signatures, also known as acoustic models, are trained using a large amount of training data. Generally, this training data is collected from a large number of different speakers to make an ASR system that can recognize audio from a wide range of speakers (a.k.a. speaker independent ASR system). It is known that such generic acoustic models, though performing well on a wide range of users, may not perform as well on a given user compared to an acoustic model trained over just that user. To match the acoustic model to a specific user, in practice, an ASR system may adapt its generic acoustic model using a small amount of audio data from a target speaker to create a speaker specific acoustic model that performs significantly better than a generic acoustic model. This process is referred to as acoustic model adaptation or speaker adaptation.

Acoustic model adaptation can be performed as supervised or unsupervised. In both cases, the ASR system uses audio files from the target user(s) and corresponding transcriptions. In supervised adaptation, the correctness of the transcription is verified by a human, explicitly or implicitly. In unsupervised model adaptation, the system uses a transcription that is automatically generated without explicit human verification. In unsupervised adaptation, the transcription may be incorrect, and adapting on incorrect transcription can potentially degrade performance. Minimizing incorrect adaptation is one challenge for unsupervised adaptation.

One application of speech recognition technology is to allow voice commands to "wake up" a "sleeping" device. Some devices, such as smartphones and televisions, are designed to enter a sleep mode to conserve power when not actively used for some period of time. Once such devices go into sleep mode, they must be first "woken up" to perform a task, such as making a call in case of a smartphone, or showing a particular channel in case of a television. Traditionally, a device is woken up using a press of a button. In voice-based wakeup, a device can be woken up using a voice command. The advantage of using voice to wake up a device is that the user does not need to physically locate and touch the device. For example, for a television, the user can just say "Wake up TV" and the television wakes up, and then the user can say "Show CNN" without the user having to power on the television explicitly. In this case, "Wake up TV" is the wakeup phrase.

In a voice-based wakeup task the device, though sleeping, is constantly listening to the ambient audio for a pre-specified phrase or set of wakeup phrases. When the device detects a wakeup phrase, it wakes up and is ready to perform tasks.

One of the challenges of voice-based wakeup systems is that the ratio of wakeup audio to background can be very small. For example, in a typical scenario, a system can be listening for several hours, before a single wakeup is issued. For the single instance of wakeup audio that needs to be detected, there are several hours of background audio that must be rejected. It will be appreciated that a wakeup system should consume as little power as possible so as to maximize battery charge levels while waiting for the wakeup phrase.

SUMMARY

Embodiments of the disclosure provide methods and apparatus for automatic speech recognition with feature extraction having embedded noise processing for reducing power consumption. In embodiments, a device includes a wake-up system to detect a wake-up phrase to transition the device from a low power sleep state to an active state. It is desirable to minimize power consumption during the sleep state to maintain battery power, for example.

In one aspect of the disclosure, a method comprises receiving a microphone signal; determining whether the microphone signal contains noise above a noise threshold; determining whether the microphone signal contains speech when the noise threshold is exceeded; determining a noise estimate for the microphone signal when speech is found not to be present; performing noise filtering using the noise estimate on the microphone signal when speech is found to be present; and performing feature extraction on the microphone signal when speech is found to be present, wherein the feature extraction and the noise estimate use an output of the same Fourier Transform, such that the noise filtering of the speech is embedded with the feature extraction of the speech.

In a further aspect of the disclosure, a system comprises: a processor and memory configured to: determine whether a microphone signal contains noise above a noise threshold; determine whether the microphone signal contains speech when the noise threshold is exceeded; determine a noise estimate for the microphone signal when speech is found not to be present; perform noise filtering using the noise estimate on the microphone signal when speech is found to be present; and perform feature extraction on the microphone signal when speech is found to be present, wherein the feature extraction and the noise estimate use an output of the same Fourier Transform, such that the noise filtering of the speech is embedded with the feature extraction of the speech.

In a further aspect of the disclosure, an article comprises: a non-transitory computer readable medium having stored instructions that enable a machine to: determine whether a microphone signal contains noise above a noise threshold; determine whether the microphone signal contains speech when the noise threshold is exceeded; determine a noise estimate for the microphone signal when speech is found not to be present; perform noise filtering using the noise estimate on the microphone signal when speech is found to be present; and perform feature extraction on the microphone signal when speech is found to be present, wherein the feature extraction and the noise estimate use an output of the same Fourier Transform, such that the noise filtering of the speech is embedded with the feature extraction of the speech.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
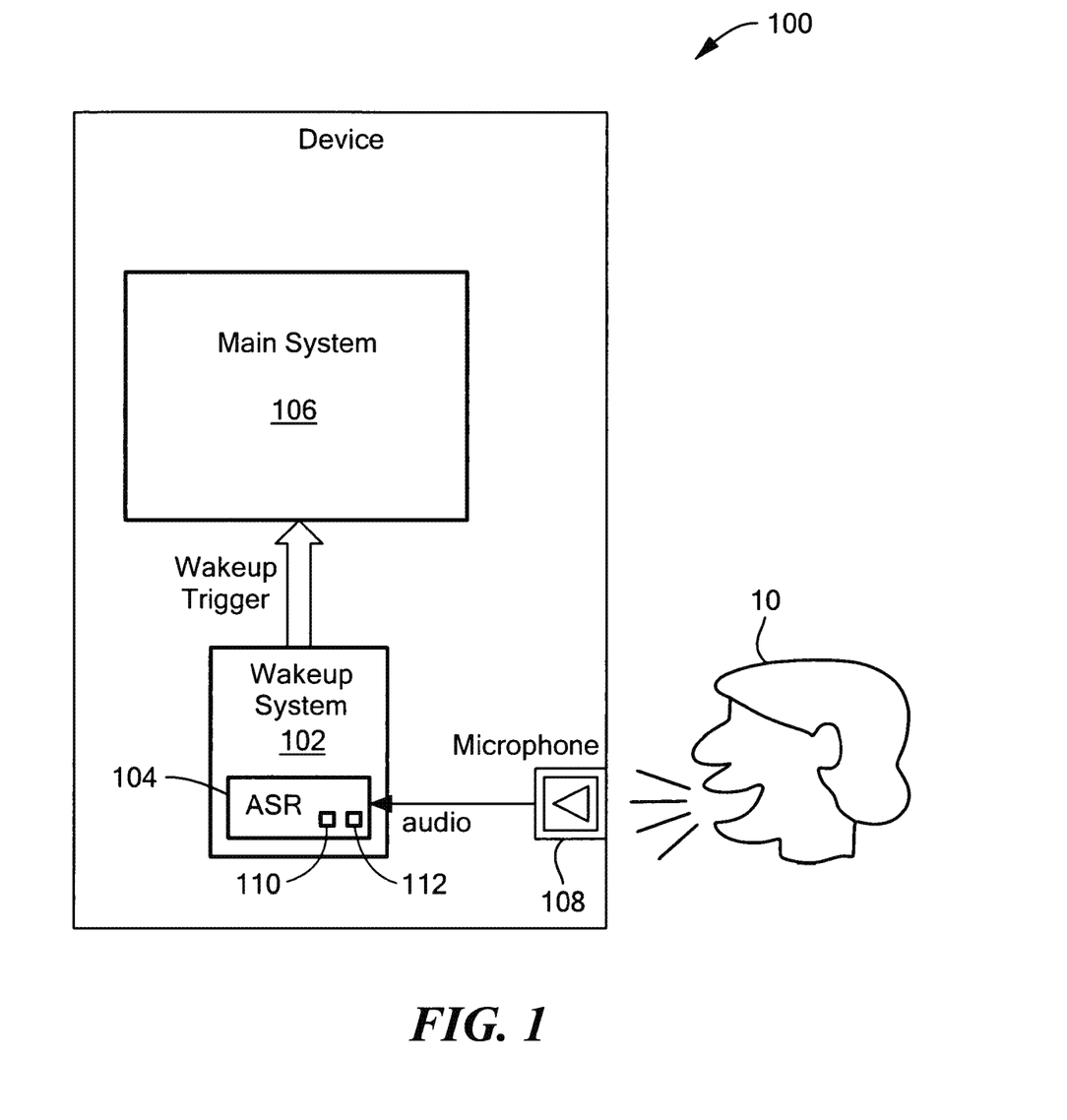
FIG. 1 is a schematic representation of a system having unsupervised wakeup.

FIG. 1 shows an illustrative high level architecture of a system 100 including a device wakeup system 102 having automatic speech recognition (ASR) and feature extraction with embedded noise processing to reduce power consumption. In one embodiment, a relatively small, low power wakeup system on the device contains an automatic speech recognition (ASR) system 104 that is continuously listening to the ambient audio for a wakeup phrase. Upon detecting a wakeup phrase, a wakeup circuit wakes up the main system 106. For example, if the wakeup phrase is "Hello Dragon," then a user 10 of the device may say "Hello Dragon, call home," which is provided to the wakeup system 102 via a microphone 108. The device 100 wakes up upon receiving the wakeup phrase (Hello Dragon) and then executes the voice command ("call home") from the user.

The ASR module 104 provides voice-based wakeup functionality using an acoustic module 110 and a language module 112 to recognize speech in a manner well known in the art. In general, when a wakeup phrase is received by the device, the corresponding character string is converted to a sequence of phonemes. For each phoneme, the processing module 102 identifies neighboring phonemes to create a tri-phone that is converted into a sequence of states. Each tri-phone has a model for a sequence of acoustic states. Generally, a given tri-phone model has two or a few states: a beginning and an end, or a beginning, a middle, and an end. The result is a set of acoustic model states used for look-up in the acoustic model for scoring. Tri-phones are mapped to acoustic models or acoustic model states, thereby creating a sequence.

Figure 1A:
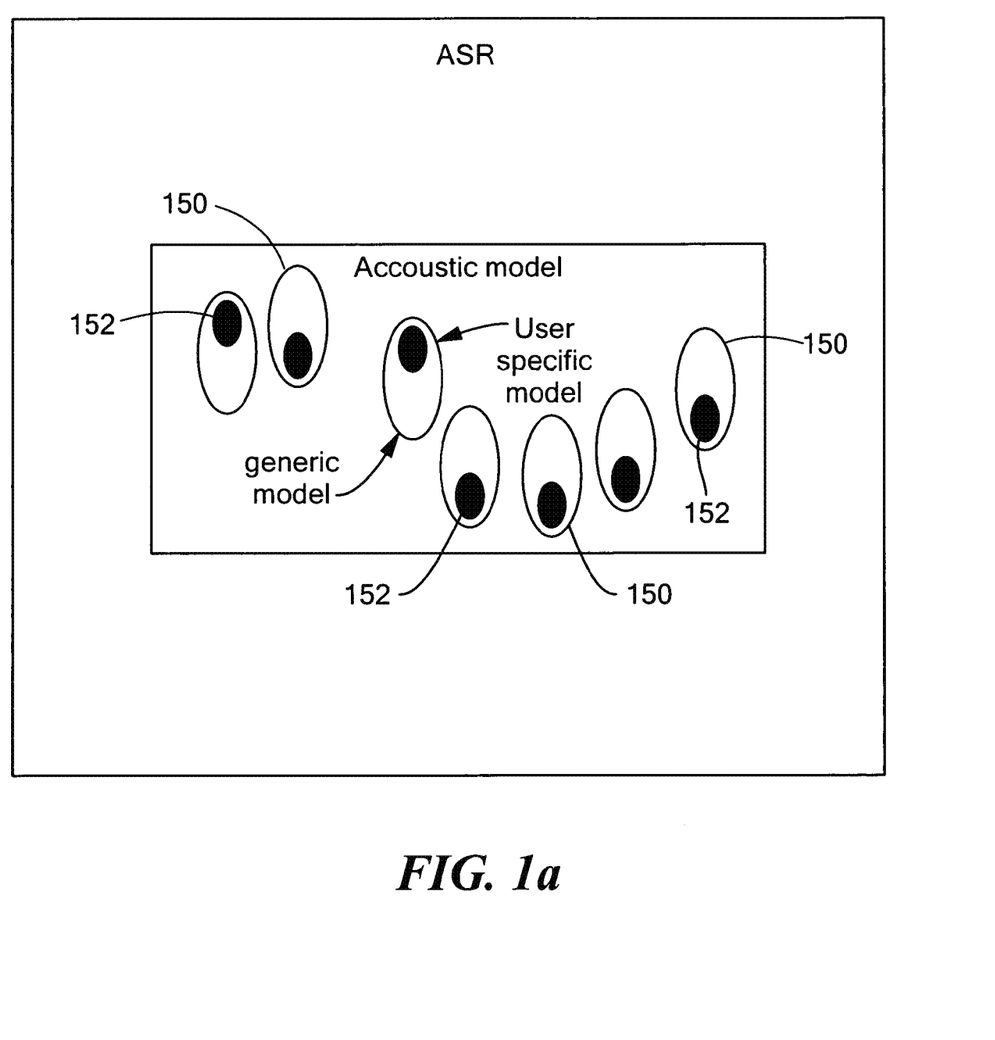
FIG. 1A illustrates generic acoustic model states and user-specific acoustic model states.

FIG. 1A illustrates generic acoustic model states 150 and user-specific acoustic model states 152. A given user only uses a small fraction of the generic models 150. In the generic model, the model parameters are used to model a wider parameter space so that sometimes the acoustics for a user are not modeled properly. In the adapted models 152, the same number of parameters as generic models are used to model only the acoustic space of the user, thus yielding a better and more robust model for that user.

In supervised adaptation, i.e., enrollment, the user is asked to speak the wakeup phrase a few, e.g., three, times. The ASR system processes the utterances and estimates the user-specific models 152. In unsupervised adaptation, rather than asking the user to specifically provide these utterances, the system automatically identifies the wakeup utterances from user's normal usage of the wakeup system and adapts the models.

In embodiments of the disclosure, the device wake-up system 102 includes noise suppression processing that is embedded with the speech feature extraction processing so as to reduce the processing overhead. It will be appreciated that device wake-up performance can be degraded by noise. For example, a person with a cell phone traveling in a car with multiple passengers may be subject to noise in the form of wind noise, road noise, one or more conversations, or other noise sources. In the context of device wake-up, noise may refer to sound that is not the user directing speech to the device that includes the wake-up phrase for the device. Some embodiments are well-suited to reduce the impact of stationary noise, as well as nonstationary noise.

Figure 2:
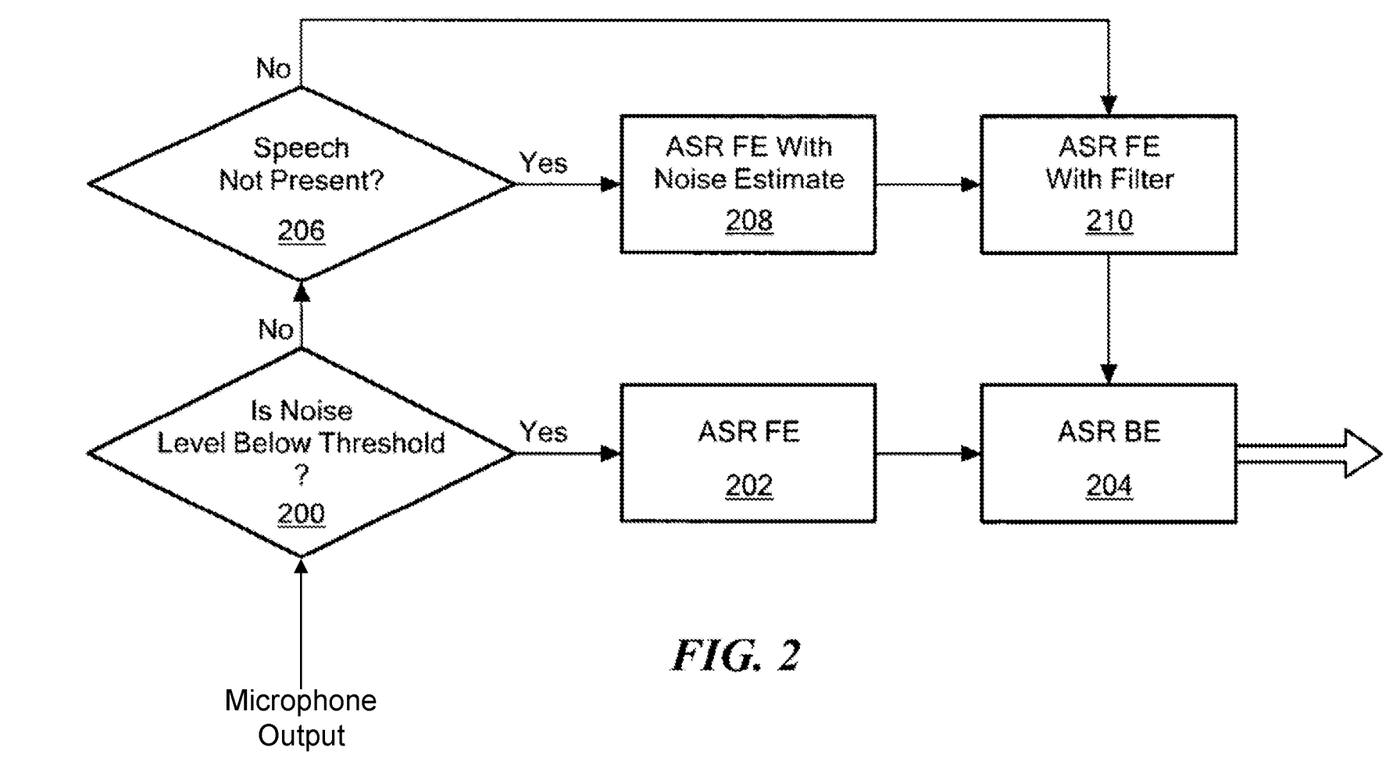
FIG. 2 is a flow diagram showing an example sequence of steps for performing feature extraction with embedded noise processing.

FIG. 2 shows an example process for low power wake-up. In step 200, it is determined whether noise is present in the vicinity of the device. For example, an output signal from a microphone of the device can be analyzed to determine if the noise level is below a given threshold. If so, automatic speech recognition (ASR) feature extraction can be performed in step 202. In step 204, ASR uses the feature extraction output to perform remaining speech recognition processing. In steps 202 and 204, noise reduction processing is not performed since noise is below the threshold of step 200.

If the noise level was determined in step 200 to be above the noise threshold, in step 206, it is determined whether speech is present. For example, a voice activity detection (VAD) module can determine whether speech is present in the microphone signal. If speech is not present, in step 208, a noise estimate is obtained. In embodiments, the noise estimate is obtained as part of the ASR feature extraction (FE) process. In step 210, noise filtering is performed. If it was determined in step 206 that speech was present, processing proceeds to noise filtering 210 without obtaining a new noise estimate. In embodiments, a noise estimate is used until it is updated in step 208 when speech not present.

Figure 3:
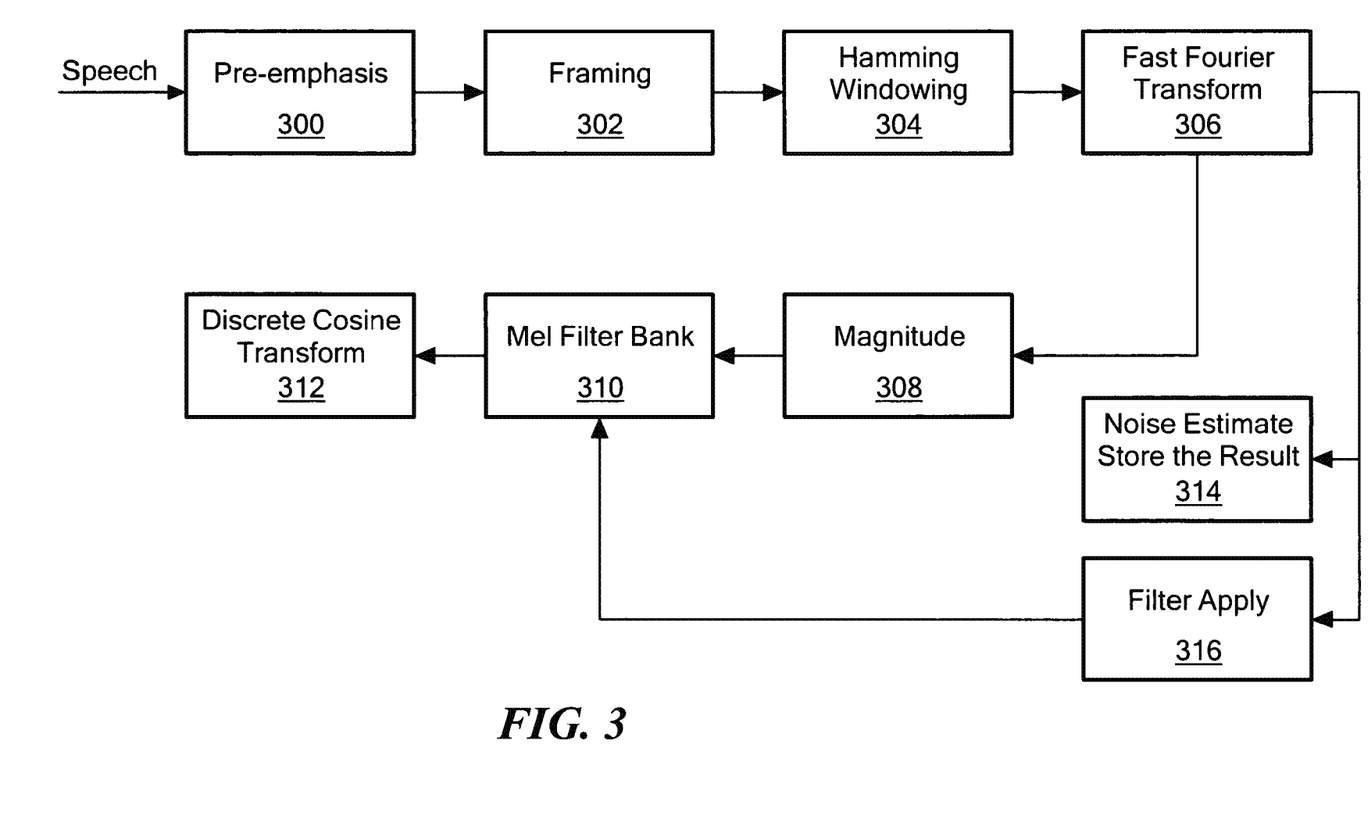
FIG. 3 is a diagram showing an example implementation of feature extraction with embedded noise processing using a Mel cepstrum coefficients.

FIG. 3 shows an example process to perform automatic speech recognition feature extraction with embedded noise processing using information from FIG. 2. In step 300, a speech input signal is processed by a pre-emphasis module followed by speech framing 302. In embodiments, the framed speech is windowed 304, such as by a Hamming window process. The windowed speech signal is processed with a Fast Fourier Transform (FFT) 306, for example, to convert the signal to the frequency domain. The FFT 306 output is processed to determine signal magnitudes 308 for input to a Mel filter bank 310 and Discrete Cosine Transform 312.

It will be appreciated that feature extraction (FE) is a fundamental part of automatic speech recognition that can significantly impact performance. Feature extraction strives to generate a compact sequence of feature vectors providing a representation of the given input signal. Feature extraction is usually performed in a number of stages. Speech analysis or the acoustic front end performs spectro-temporal analysis of the signal and generates raw features describing the envelope of the power spectrum of short speech intervals.

Another stage compiles an extended feature vector composed of static and dynamic features. A further stage transforms the extended feature vectors into more compact and robust vectors that are then supplied to a speech recognizer module.

In embodiments, Cepstral Analysis can be used for separating the excitation from the vocal tract shape. Mel Cepstrum Analysis uses cepstrum with a nonlinear frequency axis following a Mel scale. For obtaining Mel Cepstrum, the speech waveform is first windowed with an analysis window and then its DFT is computed. The magnitude output is then weighted by a series of Mel filter frequency responses whose center frequencies and bandwidth roughly match those of auditory critical band filters.

Mel-Frequency Cepstrum Coefficients (MFCCs) provide a compact representation, which is the result of a cosine transform of the real logarithm of the short-term energy spectrum expressed on a mel-frequency scale. The performance of the Mel-Frequency Cepstrum Coefficients (MFCCs) may be affected by the number of filters, the shape of filters, the way that filters are spaced and the way that the power spectrum is warped. The conventional MFCC calculation excludes the 0th coefficient which can be regarded as the generalized Frequency Band Energy (FBE), which results in the FBE-MFCC.

The MFCCs collectively make up an MFC where the coefficients are derived from a cepstral representation of the audio. In the MFC, the frequency bands are equally spaced on the mel scale to approximate the human auditory system's response more closely than linearly-spaced frequency bands used in the normal cepstrum. This frequency warping can allow for better representation of sound, for example, in audio compression. The MFCCs are typically derived by taking the Fourier transform of a windowed excerpt of a signal, mapping the powers of the spectrum from the FFT onto the mel scale, such as by using triangular overlapping windows, taking the logs of the powers at each of the mel frequencies, and taking the discrete cosine transform of the mel log powers as if a signal, where the resultant MFCCs correspond to the amplitudes of the resulting spectrum.

Referring again to FIG. 3, the output of the FFT 306 is provided to a noise estimate module 314 which generates a noise estimate for the microphone signal when noise is detected but no speech is present, as described in the illustrative embodiment of FIG. 2. In embodiments, subject to noise and speech, a noise estimate is generated about every six frames. It is understood that noise estimates can be generated at any suitable number per time duration, and/or event driven, to meet the needs of a particular application.

The output of the FFT 306 is also provided to a filter module 316 which provides noise reduction for the microphone signal. In embodiments, the filter module 316 uses the noise estimate from noise estimate module 314 to perform noise reduction processing. In general, any suitable noise processing technique can be used to meet the needs of a particular application. In certain embodiments where it is desirable to minimize the number of processing cycles for noise reduction, some noise processing techniques may be preferred over others. For example, in the case of additive white Gaussian noise, linear techniques, such as Wiener filtering, can be used. In embodiments, a Wiener-based filter is used for noise reduction adapted for reduced processing resources.

In an example embodiment, a noise estimate is computed as:

pnoiseStats=1./Squares(FFT(silence_frame))

where Squares(x)=x.^2, e.g. squares([1,2,3])=[1,4,9])

As noted above, a noise estimate is determined for a frame where noise is present but speech is not present, which is represented above as "silence_frame," by performing a Fast Fourier Transform (FFT).

An example filter process is set forth below. It should be noted that the FFT output is filtered to reduce noise and provided as a magnitude output to the Mel filter bank module 310 (FIG. 3). That is, the magnitude is computed as part of the filtering process bypassing the magnitude module 308. As described above, filtering is performed for a frame that contains speech, as determined, for example, by the VAD of step 206 of FIG. 2. An initial magnitude is computed from the FFT of a speech frame, as:

magy=Squares(FFT(speech_frame))

From the initial magnitude and noise estimate, in an example embodiment, filter coefficients alpha and beta are determined. The first/alpha filter coefficient can be computed as:

alpha=magy.*pnoiseStats-1, where magy refers to the initial magnitude from the speech frame above and pnoiseStats refers to the noise estimate above.

Using the computed first filter coefficient alpha and initial magnitude (magy on right side of equation below), a new magnitude value (magy left side of equation below) is generated by:

magy=((alpha)/(alpha+1)).^2.*magy

In an example embodiment, the second filter coefficient beta is computed from the noise estimate and the magnitude value generated using the alpha filter coefficient as:

beta=magy.*pnoiseStats

A new magnitude value is then computed from the beta filter coefficient and the magnitude generated using the alpha coefficient above as:

magy=beta/(beta+1).*magy

This magnitude value computed using the alpha and beta filter coefficients is provided to the Mel filter bank module 310 of FIG. 3.=

In Wiener filter based embodiments, alpha and beta are intermediate iteration variables and magy is the output of the filter so that alpha and beta are used for generating the output.

As described above, without noise reduction processing, the FFT 306 output is provided to the magnitude module 308, as shown in FIG. 3, and with noise filtering, the filter module 316 provides filtered, i.e., noise-reduced, magnitude information to the Mel filter bank module 310.

In embodiments, noise estimation and filtering will not be performed for the same frame in order to reduce the number of CPU cycles needed to process a given frame. In addition, embedding the noise reduction processing into the feature extraction, e.g., using MFCCs, further reduces the per frame CPU cycles required for processing. In conventional processing, a FFT just for noise reduction processing may be generated in addition to the FFT for feature extraction. In contrast, in embodiments of the disclosure, the FFT used for the feature extraction is also used for noise reduction processing. It will be appreciated that an inverse transform just for the noise reduction is also eliminated by embedding noise reduction into feature extraction processing. One of ordinary skill in the art will appreciated the amount of processor cycles required to perform Fourier transforms and inverse Fourier transforms and associated processing and resources, such as memory. In embodiments, reuse can reduce processing cycles, for example, information from magnitude information from step 308 of FIG. 3 can be reused. In embodiments, step 308 is skipped when performing filter processing in step 314 as it may use the Wiener filter information, which also reduces CPU cycles.

While illustrative embodiments of the disclosure are shown and described in conjunction with wake-up of a device using MFCCs, it is understood that embodiments of the disclosure are applicable to ASR in general in which it is desirable to reduce a number of processor cycles.

It is understood that embodiments of the disclosure can be implemented in a wide variety of device and configurations. For example, a battery powered mobile phone typically includes two processors, such as a main/primary processor and a secondary/digital signal processor (DSP). The main processor handles the bulk of the processing during active use of the phone, such as phone calls, utility applications, email, games, and the like. In one embodiment, the DSP is used to provide computation at low power. For example, the DSP is active and listens for incoming phone calls while the phone is in a standby mode or not actively being used.

In one embodiment, unsupervised wakeup functionality runs on two separate speech recognition systems on a device. A first speech system, which is relatively large, runs on the main processor of a device, and a second speech system, which is comparatively smaller, runs on the DSP. The first speech system can include a full set of speech recognition models for a particular mobile application, such as for recognizing commands to access contacts, email, songs, perform tasks, and run applications. This full set of models enables a user to be able to select a custom phrase or word for use as a spoken wakeup phrase.

The first speech system receives a wakeup phrase and uses this phrase to convert speech models and code to a relatively small system for use on the DSP. That is, the main processor pre-computes the smaller speech system, which can include a network of recognition states and acoustic model information. The network of recognition states can be used by a decoder that searches for a best path through a sequence of states. The acoustic model information can include measurements from recordings of speech. Embodiments can function well with a relatively small subset of acoustic model information used for the DSP wake-up feature. These two parts are combined together into a system that is small compared to the main processor voice recognition system.

The recognizer on the DSP then functions as a wakeup phrase detector. For example, the recognizer essentially determines whether a wakeup candidate was received. Once the DSP recognizer determines that a wakeup phrase has been uttered, the main processor recognizer becomes active. An exemplary multi-processor wakeup implementation is shown and described in U.S. Patent Publication No. 2013/0289994, which is incorporated herein by reference.

Figure 4:
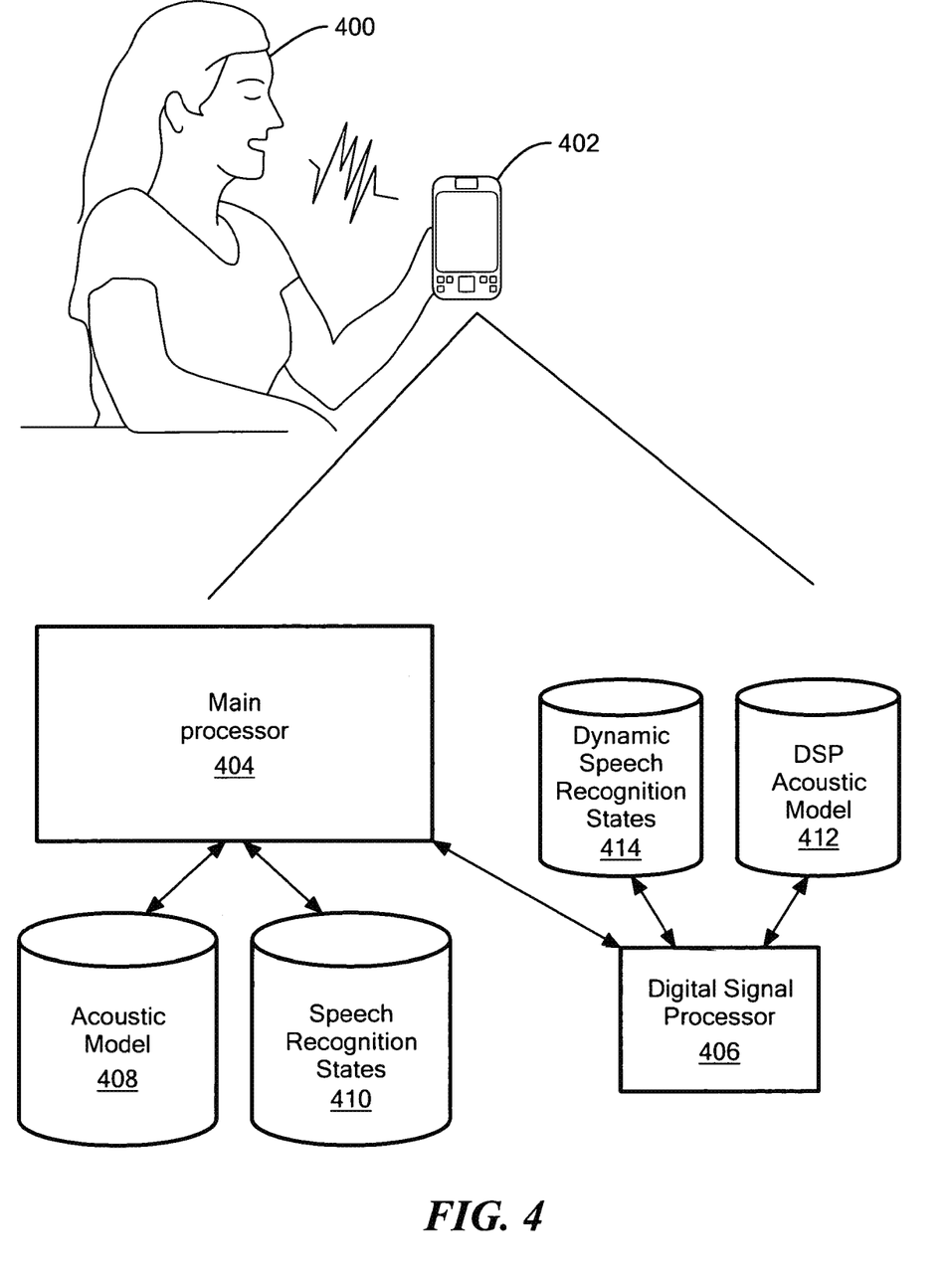
FIG. 4 shows a schematic representation of an illustrative implementation of system wakeup with noise processing embedded with feature extraction.

FIG. 4 shows a multi-processor implementation of wakeup functionality with ASR and embedded noise filtering in accordance with illustrative embodiments of the disclosure. A user 400 operates an electronic device 402 having voice command functionality including a wakeup feature. The user 400 can input a particular wakeup phrase. After the user 400 enters the wakeup phrase, a main processor 404 creates a speech recognition system or state for use by a digital signal processor 406. The main processor 404 can access an acoustic model 408 and speech recognition states 410 while generating data for the wakeup functionality. The main processor 406 can gather acoustic model data from speaker-independent acoustic model 408 for use as a secondary acoustic model 412. The DSP 406 can then receive this data and store it as dynamic speech recognition states 414. During speech recognition, the DSP 406 can access both the speech recognition states 414 and the secondary acoustic model 412. The recognition feature on the DSP 406 can run while the main processor 404 is inactive, on standby, etc. After the DSP 406 detects a candidate wakeup phrase, the DSP signals the main processor 404 to become active. In embodiments, the DSP 406 can include feature extraction with embedded noise reduction, as described above.

Figure 5:
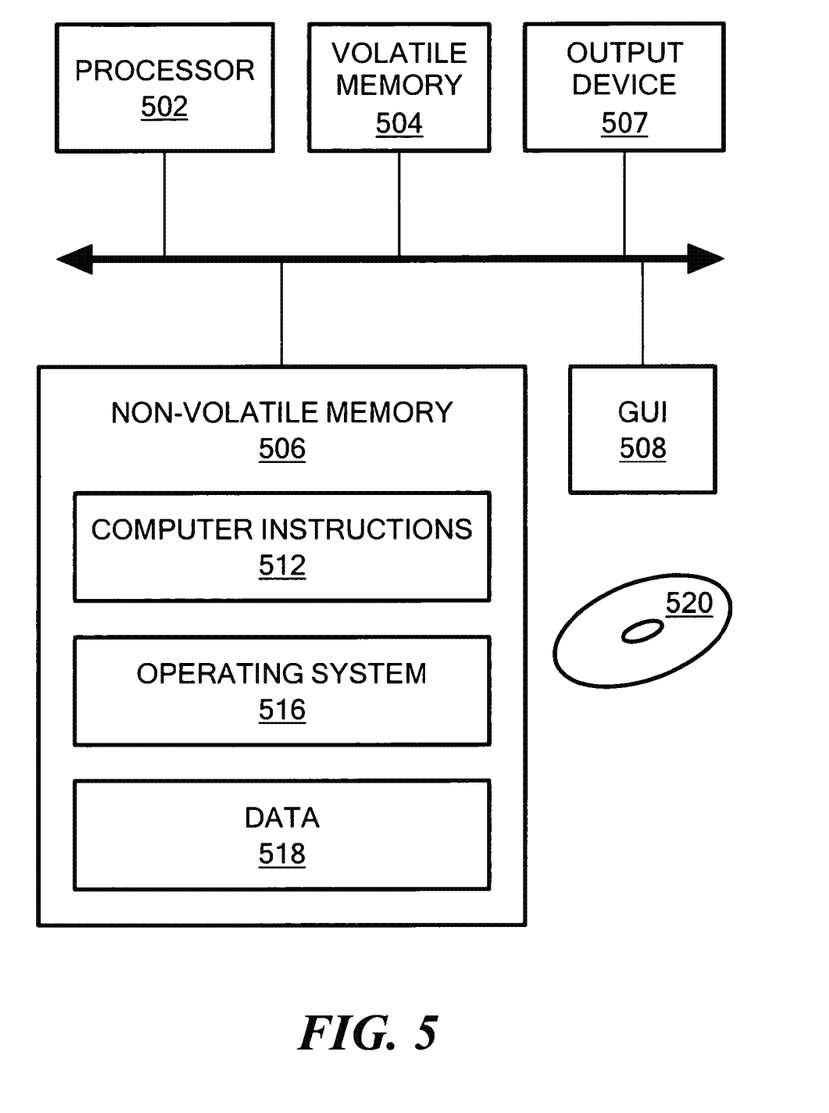
FIG. 5 is a schematic representation of an illustrative computer that can perform at least a portion of the processing described herein.

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
    receiving a microphone signal;
    determining whether a noise level of the microphone signal exceeds a noise threshold;
    selecting between a first signal processing procedure and a second signal processing procedure, different from the first signal processing procedure, based on whether the noise level exceeds the threshold;
    performing the first signal processing procedure when the noise level of the microphone signal exceeds the noise threshold, the first signal processing procedure including:
        determining whether the microphone signal contains speech;
        determining a noise estimate for the microphone signal when speech is found not to be present;
        performing noise filtering using the noise estimate on the microphone signal when speech is found to be present; and
        performing feature extraction on the microphone signal when speech is found to be present, such that the noise filtering of the speech is embedded with the feature extraction of the speech; and
    performing the second signal processing procedure when the noise level of the microphone signal does not exceed the noise threshold, the second signal processing procedure including performing feature extraction on the microphone signal.

2. The method according to claim 1, wherein the noise estimate and the noise filtering are not performed on a same frame of the microphone signal.

3. The method according to claim 1, further including determining whether the microphone signal contains a wake-up phrase after the noise filtering.

4. The method according to claim 1, wherein the feature extraction is performed while a device containing the microphone is in a sleep state.

5. The method according to claim 1, wherein the feature extraction includes the use of mel-frequency cepstral coefficients (MFCCs).

6. The method according to claim 1, further including using a main processor and a lower power processor to provide processing of a wakeup phrase for a device.

7. The method according to claim 6, wherein the lower power processor performs the feature extraction and noise processing to identify the wakeup phrase.

8. A system comprising:
    a processor and memory configured to:
        determine whether a noise level of a microphone signal exceeds a noise threshold;
        select between a first signal processing procedure and a second signal processing procedure, different from the first signal processing procedure, based on whether the noise level exceeds the threshold;
        perform the first signal processing procedure when the noise level of the microphone signal exceeds the noise threshold, the first signal processing procedure including:
            determining whether the microphone signal contains speech;
            determining a noise estimate for the microphone signal when speech is found not to be present;
            performing noise filtering using the noise estimate on the microphone signal when speech is found to be present; and
            performing feature extraction on the microphone signal when speech is found to be present, such that the noise filtering of the speech is embedded with the feature extraction of the speech; and
        perform the second signal processing procedure when the noise level of the microphone signal does not exceed the noise threshold, the second signal processing procedure including performing feature extraction on the microphone signal.

9. The system according to claim 8, wherein the noise estimate and the noise filtering are not performed on a same frame of the microphone signal.

10. The system according to claim 8, further including determining whether the microphone signal contains a wake-up phrase after the noise filtering.

11. The system according to claim 8, wherein the feature extraction is performed while a device containing the microphone is in a sleep state.

12. The system according to claim 8, wherein the feature extraction includes the use of mel-frequency cepstral coefficients (MFCCs).

13. The system according to claim 8, further including using a main processor and a lower power processor to provide processing of a wakeup phrase for a device.

14. The system according to claim 13, wherein the lower power processor performs the feature extraction and noise processing to identify the wakeup phrase.

15. An article, comprising: a non-transitory computer readable medium having stored instructions that enable a machine to:
    determine whether a microphone signal has a noise level above a noise threshold;
    select between a first signal processing procedure and a second signal processing procedure, different from the first signal processing procedure, based on whether the noise level is above the threshold;
    perform the first signal processing procedure when the noise level of the microphone signal is above the noise threshold, the first signal processing procedure including:
        determining whether the microphone signal contains speech;
        determining a noise estimate for the microphone signal when speech is found not to be present; perform noise filtering using the noise estimate on the microphone signal when speech is found to be present; and
        performing feature extraction on the microphone signal when speech is found to be present, such that the noise filtering of the speech is embedded with the feature extraction of the speech; and
    perform a second signal processing procedure when the noise level of the microphone signal is not above the noise threshold, the second signal processing procedure including performing feature extraction on the microphone signal.

16. The article according to claim 15, wherein the noise estimate and the noise filtering are not performed on a same frame of the microphone signal.

17. The article according to claim 15, further including instructions for determining whether the microphone signal contains a wake-up phrase after the noise filtering.

18. The article according to claim 15, wherein the feature extraction is performed while a device containing the microphone is in a sleep state.

19. The article according to claim 15, wherein the feature extraction includes the use of mel-frequency cepstral coefficients (MFCCs).

20. The article according to claim 15, further including using a main processor and a lower power processor to provide processing of a wakeup phrase for a device.

21. The method of claim 6, wherein the lower power processor performs denoising and feature extraction for an automatic speech recognition operation performed by the main processor.

* * * * *